(12) United States Patent
Leib

(10) Patent No.: US 11,558,298 B2
(45) Date of Patent: *Jan. 17, 2023

(54) CONGESTION AVOIDANCE IN A NETWORK SWITCH DEVICE

(71) Applicant: Marvell Israel (M.I.S.L) Ltd., Yokneam (IL)

(72) Inventor: Zvi Shmilovici Leib, Tel Aviv (IL)

(73) Assignee: Marvell Israel (M.I.S.L) Ltd., Yokneam (IL)

(*) Notice: Subject to any disclaimer, the term of this patent is extended or adjusted under 35 U.S.C. 154(b) by 46 days.

This patent is subject to a terminal disclaimer.

(21) Appl. No.: 17/170,501

(22) Filed: Feb. 8, 2021

(65) Prior Publication Data

US 2021/0168075 A1 Jun. 3, 2021

Related U.S. Application Data

(63) Continuation of application No. 16/045,488, filed on Jul. 25, 2018, now Pat. No. 10,917,349.

(Continued)

(51) Int. Cl.
| | |
|---|---|
| *H04L 47/12* | (2022.01) |
| *H04L 47/11* | (2022.01) |
| *H04L 49/00* | (2022.01) |
| *H04L 47/24* | (2022.01) |
| *H04L 49/25* | (2022.01) |

(Continued)

(52) U.S. Cl.
CPC .............. *H04L 47/12* (2013.01); *H04L 43/16* (2013.01); *H04L 47/11* (2013.01); *H04L 47/24* (2013.01); *H04L 47/26* (2013.01); *H04L 49/25* (2013.01); *H04L 49/30* (2013.01); *H04L 49/9084* (2013.01); *H04L 47/30* (2013.01)

(58) Field of Classification Search
CPC ......... H04L 47/12; H04L 43/16; H04L 49/25; H04L 47/24; H04L 49/30; H04L 47/11; H04L 47/30; H04L 49/9084; H04L 47/26

See application file for complete search history.

(56) References Cited

U.S. PATENT DOCUMENTS

| | | |
|---|---|---|
| 5,905,870 A | 5/1999 | Mangin et al. |
| 6,035,333 A | 3/2000 | Jeffries |

(Continued)

OTHER PUBLICATIONS

Chen, "Home Network Basis: Transmission Environments and Wired/Wireless Protocols," Prentice Hall, 26 pages (2006).

(Continued)

*Primary Examiner* — Sharmin Chowdhury

(57) ABSTRACT

Packets received by a network switch device from upstream network devices, coupled to respective ones of a plurality of ports of the network switch device, are temporarily stored in an internal memory of the network switch device. In response to detecting congestion in the internal memory of the network switch device, a flow control engine triggers, during respective timeslots of a timing schedule and while the flow control engine continues to monitor congestion in the internal memory of the network switch device, transmission of respective flow control messages via different subsets of ports, among the plurality of ports, to control flow of packets from different subsets of upstream network device, among the plurality of upstream network devices, to the network switch device so that flow control is distributed over time among upstream network devices of the plurality of upstream network devices.

20 Claims, 3 Drawing Sheets

Related U.S. Application Data

(60) Provisional application No. 62/544,401, filed on Aug. 11, 2017.

(51) Int. Cl.
*H04L 43/16* (2022.01)
*H04L 49/90* (2022.01)
*H04L 47/26* (2022.01)
*H04L 47/30* (2022.01)

(56) References Cited

U.S. PATENT DOCUMENTS

| | | | |
|---|---|---|---|
| 8,018,851 | B1 | 9/2011 | Medina et al. |
| 10,749,803 | B1 | 8/2020 | Leib |
| 10,917,349 | B2 | 2/2021 | Leib |
| 2004/0088451 | A1 | 5/2004 | Han |
| 2012/0250511 | A1 | 10/2012 | Neeser |
| 2013/0250762 | A1 | 9/2013 | Assarpour |
| 2017/0339062 | A1 | 11/2017 | Mayer-Wolf et al. |
| 2017/0339075 | A1 | 11/2017 | Arad |

OTHER PUBLICATIONS

IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 GB/s Operation *The Institute of Electrical and Electronics Engineers, Inc.*, 540 pages (May 1, 2002).

IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, 60 pages, (Aug. 17, 2005).

IEEE P802.1aq/D4.6, Draft Amendment to IEEE Std 802.1Q-2011, "IEEE Draft Standard for Local and Metropolitan Area Networks—Media Access Control (MAC) Bridges and Virtual Bridged Local Area Networks—Amendment XX: Shortest Path Bridging," *The Institute of Electrical and Electronics Engineers, Inc.*, 363 pages (Feb. 10, 2012).

IEEE Std 802.1Q-2011 (Revision of IEEE Std.802.1Q-2005), "IEEE Standard for Local and Metropolitan Area Networks—Media Access Control (MAC) Bridges and Virtual Bridged Local Area Networks," *The Institute of Electrical and Electronics Engineers, Inc.*, 1,365 pages (Aug. 31, 2011).

IEEE Std 802.1Q™ -2014 "(revision of IEEE Std. 802.1Q-2011) IEEE Standard for Local and metropolitan area networks—Bridges and Bridged Networks" IEEE Computer Society 1832 pages (2014).

IEEE Std 802.1Q, 2003 Edition, "IEEE Standards for Local and Metropolitan area networks—Virtual Bridged Local Area Networks," *The Institute of Electrical and Electronics Engineers, Inc.*, 327 pages (May 7, 2003).

IEEE Std 802.1Qau, Amendment to IEEE Std 802 1Q-2005, "Virtual Bridged Local Area Networks—Amendment 13: Congestion Notification" The Institute of Electrical and Electronics Engineers, Inc., 135 pages, Apr. 2010.

IEEE Std 802.3-2002, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, 379 pages (Mar. 8, 2002).

IEEE Std 802.3-2005 (revision), "IEEE Standard for Information technology—Telecommunications and information exchange between systems—Local and metropolitan area networks—Specific requirements, Part 3: Carrier Sense Multiple Access with Collision Detection (CSMA/CD) access method and physical layer specifications," The Institute of Electrical and Electronics Engineers, Inc., 417 pages (2005).

IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, Sections 1-5, 2695 pages (Dec. 9, 2005).

IEEE Std 802.3af™ "IEEE Standard for Information technology—Telecommunications and information exchange between systems—Local and metropolitan area networks—Specific requirements Part 3: Carrier Sense Multiple Access with Collision Detection (CSMA/CD) Access Method and Physical Layer Specifications, Amendment: Data Terminal Equipment (DTE) Power via Media Dependent Interface (MDI)," IEEE Computer Society, *The Institute of Electrical and Electronics Engineers, Inc.*, 133 pages (Jun. 2003).

IEEE Std. 802.3bp™ -2016, "IEEE Standard for Ethernet—Amendment 4: Physical Layer Specifications and Management Parameters for 1Gb/s Operation over a Single Twisted Pair Copper Cable," *The Institute of Electrical and Electronics Engineers, Inc.*, 211 pages (Jun. 30, 2016).

IEEE Std. 802.3bp™ /D1.5, "Draft Standard for Ethernet Amendment: Physical Layer Specifications and Management Parameters for 1Gb/s Operation over a Single Twisted Pair Copper Cable," *The Institute of Electrical and Electronics Engineers, Inc.*, 202 pages (Jun. 14, 2015).

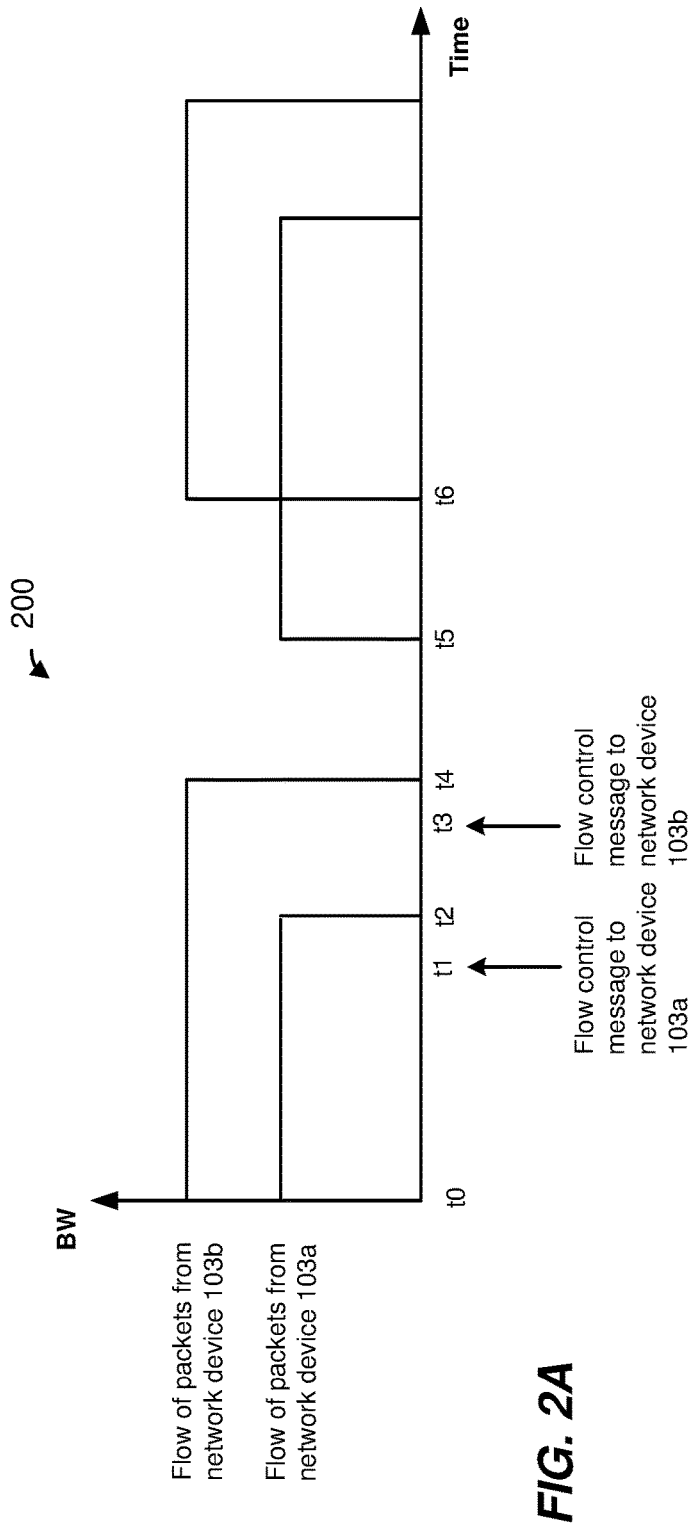
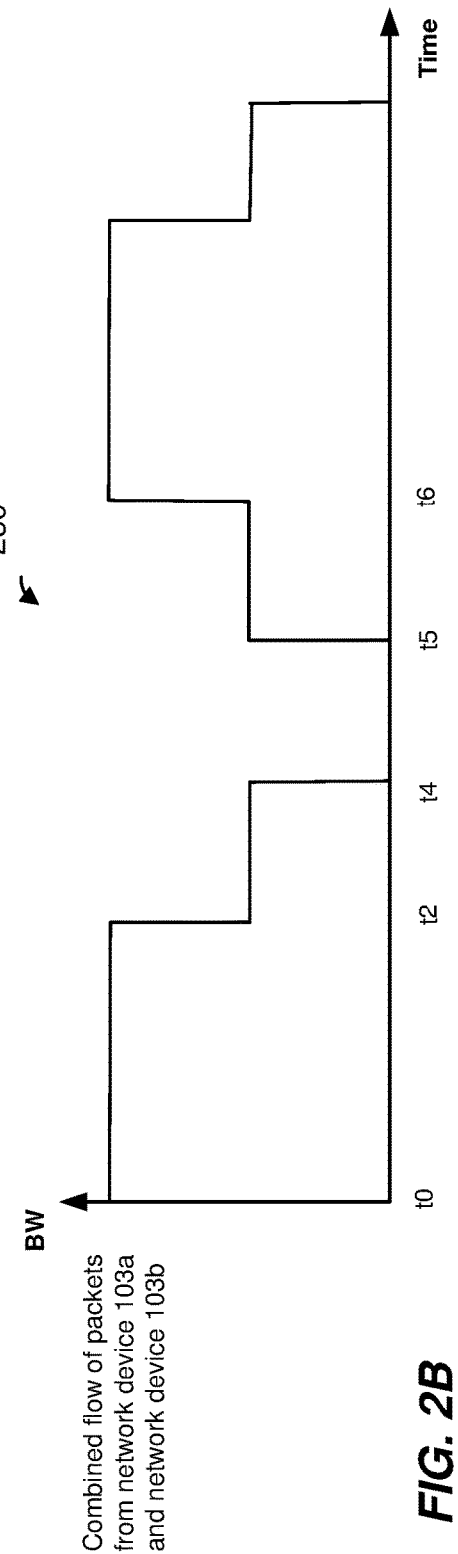
FIG. 2A
FIG. 2B

CONGESTION AVOIDANCE IN A NETWORK SWITCH DEVICE

CROSS-REFERENCES TO RELATED APPLICATIONS

This disclosure is a continuation of U.S. patent application Ser. No. 16/045,488 (now U.S. Pat. No. 10,917,349), entitled "Congestion Avoidance in a Network Switch Device," filed on Jul. 25, 2018, which claims the benefit of U.S. Provisional Patent Application No. 62/544,401, entitled "Switch Congestion Avoidance," filed on Aug. 11, 2017. Both applications are hereby incorporated by reference herein in their entireties.

FIELD OF TECHNOLOGY

The present disclosure relates generally to network devices such as network switch devices, bridges, routers, etc., and more particularly, to congestion avoidance in network devices.

BACKGROUND

A network switch device typically includes a plurality of ports coupled to different network links. The network switch device typically receives packets via ones of the ports and processes address information in a header of a received packet to determine via which other port or ports the network switch device should transmit the packet. While the network switch device performs processing of the packets and until egress interfaces are ready to transmit the packets, the packets are temporarily stored in an internal memory of the network switch device. The internal memory typically is shared by multiple ingress ports of the network switch device and temporarily stores packets received via the ingress multiple ports of the network switch device. When a determined port is available for transmission of a packet, the packet is retrieved from the internal memory and is transmitted via the determined port.

In some situations, a network switch device receives packets faster than the packets can be transmitted by the network switch device, for example because of congestion on downstream network links coupled to the network switch device, or because the network switch device is not capable of processing newly received packets sufficiently fast. In such situations, the internal memory of the network device may become congested. To prevent loss of packets in case of congestion in internal memory of a network switch device, some network switch devices generate flow control messages that subsequently are transmitted via respective ports of the network switch device to cause temporary suspension of transmission of packets by upstream network devices to the network switch device, thereby offloading memory congestion to memories of the upstream network devices (e.g., other network switch devices, end-point network devices, etc.). In a typical network switch device, when the network switch device detects congestion in an internal memory shared by multiple ingress ports, the network switch device transmits a flow control message via each of the multiple ingress ports. Accordingly, transmission of packets is simultaneously suspended by multiple upstream network devices coupled to the network switch device via the multiple ingress ports. Simultaneous suspension of transmission of packets by multiple upstream network devices to the network switch device may unnecessarily reduce utilization of network links coupled to the network switch device.

SUMMARY

In an embodiment, a method for controlling congestion at a network switch device includes: receiving packets at the network switch device from respective upstream network devices of a plurality of upstream network devices, the respective upstream network devices coupled to the network switch device via respective ones of a plurality of ports of the network switch device; temporarily storing at least some of the received packets in an internal memory of the network switch device; detecting, with a flow control engine of the network switch device, congestion in the internal memory of the network switch device; and in response to detecting congestion in the internal memory of the network device, triggering, during respective timeslots of a timing schedule and while the flow control engine continues to monitor congestion in the internal memory of the network switch device, transmission of respective flow control messages via different subsets of ports, among the plurality of ports, to control flow of packets from different subsets of upstream network device, among the plurality of upstream network devices, to the network switch device so that flow control is distributed over time among upstream network devices of the plurality of upstream network devices.

In another embodiment, a network switch device comprises a plurality of ports for coupling via respective network links to respective upstream network devices of a plurality of upstream network devices, an internal memory configured to temporarily store at least some packets received via respective ports of the plurality of ports, and a flow control engine configured to: detect congestion in the internal memory; and in response to detecting congestion in the internal memory, trigger, during respective timeslots of a timing schedule and while the flow control engine continues to monitor congestion in the internal memory of the network switch device, transmission of respective flow control messages via different subsets of ports, among the plurality of ports, to control flow of packets from different subsets of upstream network device, among the plurality of upstream network devices, to the network switch device so that flow control is distributed over time among upstream network devices of the plurality of upstream network devices.

BRIEF DESCRIPTION OF THE DRAWINGS

FIG. 2A is a timing diagram that illustrates bandwidth of packets transmitted to a network device by respective upstream network devices over time, according to an embodiment;

FIG. 2B is a timing diagram that illustrates a combined bandwidth of packets transmitted to a network device by multiple upstream network devices over time, according to an embodiment.

DETAILED DESCRIPTION

In embodiments described below, a network device (e.g., a network switch device) receives packets from multiple upstream network devices coupled to the network switch device via respective network links, and forwards the packets towards intended receivers of the packets, such as downstream end-point devices coupled directly or indirectly to the network switch device. The network switch device includes an internal memory for temporarily storing packets while the packets are being processed by the network switch device. In an embodiment, the internal memory includes a shared buffer space that is shared among multiple ports of the network switch device. In case of congestion in the internal memory, such as when the network switch device detects that the shared buffer space in the internal memory is nearing depletion, the network switch device generates and transmits a flow control message to cause one or more of the multiple upstream network devices to reduce the flow of packets to the network switch device, for example by temporarily suspending transmission of packets to the network switch device or temporarily reducing the rate of transmission of packets to the network switch device, thereby offloading congestion from the internal memory of the network switch device to memories of the one or more upstream network devices. In typical network switch devices, upon detection of congestion in a shared buffer space of an internal memory of a network switch device, the network switch device typically transmits a flow control message via several ports that share the buffer space, to cause upstream network devices coupled to several ports that share the buffer space to temporarily reduce the flow of packets to the network switch device to relieve congestion in the shared buffer space. In an embodiment, however, upon detection of congestion in the shared buffer space of the internal memory of the network switch device, the network switch device alternates transmission of flow control messages between different subsets of ports that share the buffer space, to distribute reduction in flow of packets to the network switch device over time among different subsets of upstream network devices coupled to the ports that share the buffer space. Distribution of reduction of flow of packets among different subsets of upstream network devices over time allows some upstream network devices to transmit packets to the network switch device while other upstream network devices suspend transmission of packets to the network switch device, for example. Such distribution of reduction of flow of packets among different subsets of upstream network devices improves utilization of network links between the network switch device and the upstream network devices as compared to systems that do not distribute reduction of flow of packets among subsets of upstream network devices over time, in at least some embodiments.

Figure 1:
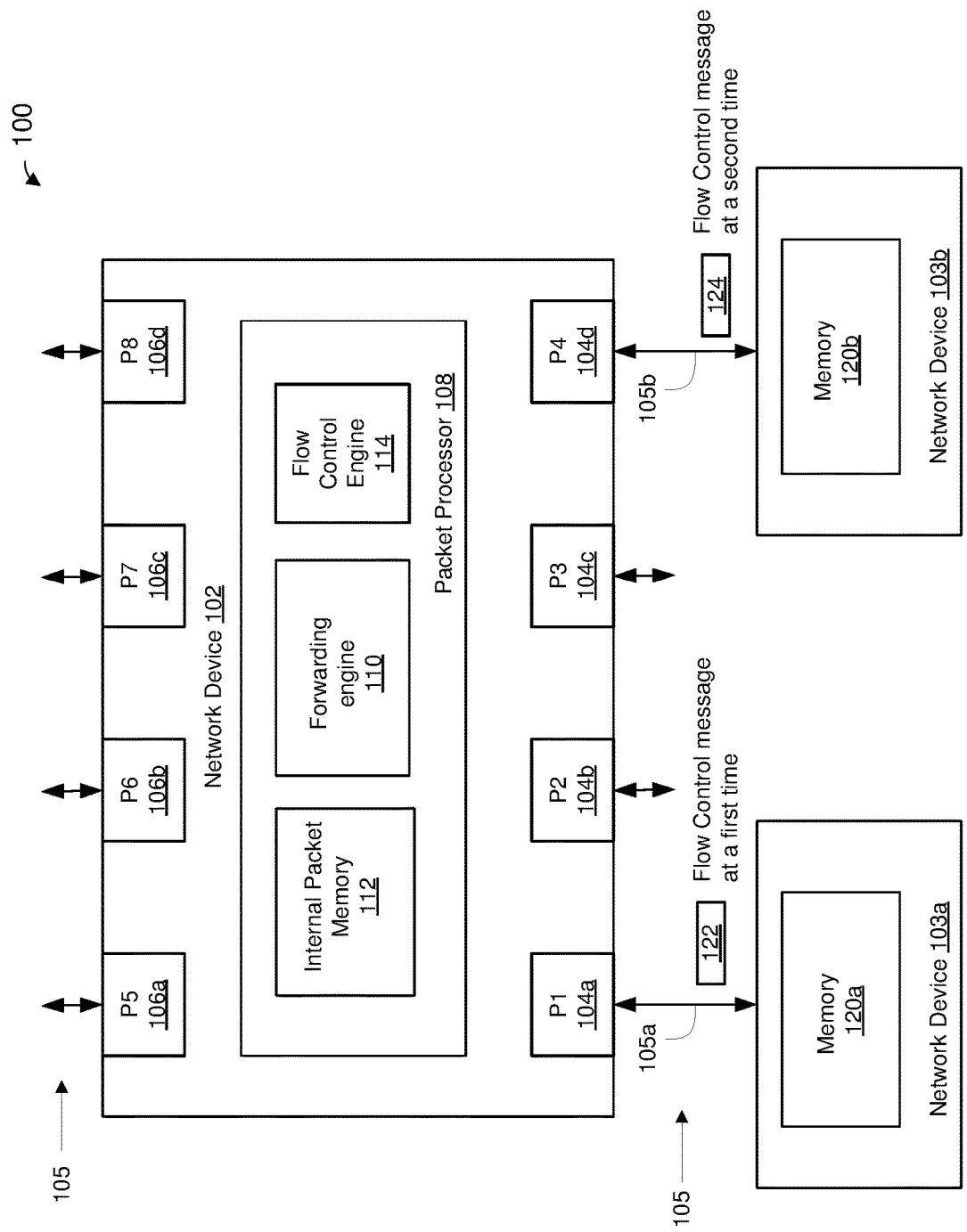
FIG. 1 is a block diagram of an example network switch device that implements flow control techniques described herein, according to an embodiment.

FIG. 1 is a block diagram of an example switching system 100 configured to implement flow control techniques described herein, according to an embodiment. In an embodiment, the switching system 100 is part of a data center network, a server farm network, or another suitable system that requires switching or routing between a large number of network interfaces (e.g., ports). In another embodiment, the switching system 100 is part of a network other than a datacenter network. For example, the switching system 100 is part of an enterprise network, in some embodiments. The switching system 100 includes a first network device 102 and a plurality of second network devices 103. The second network devices 103 are located upstream from the first network devices 102 with respect to packets flowing through the switching system 100 in the direction from the second network devices 103 to the first network devices 102, and a respective second network device 103 is sometimes referred to herein as an "upstream network device." It is noted, however, that in some configurations a second network device 103 also acts as a downstream network device with respect to packets flowing through the switching system 100 in the direction from the second network device 103 to the first network device 102, in some embodiments. In an embodiment, the first network device 102 is a network switch device, and the second network devices 103 are network devices, such as other network switch devices, end-point devices (e.g., datacenter server devices, other computing devices, storage devices, etc.), etc. that are located upstream from the network device 102 in the switching system 100.

The network device 102 includes a plurality of interfaces (e.g., ports) 104, 106 communicatively coupled to respective network links 105. The ports 104 are coupled to respective upstream network devices 103, and the ports 106 are coupled to respective downstream network devices in the switching system 100, such as next hop switching devices or next-stage switching devices in the switching system 100, in an embodiment. The ports 104 act as ingress ports with respect to packets flowing through the switching system 100 in the direction from the upstream network devices 103 to the network device 102, and the ports 104 are sometimes referred to herein as "ingress ports." The ports 106 act as egress ports with respect to packets flowing through the switching system 100 in the direction from the upstream network devices 103 to the network device 102, and the ports 106 are sometimes referred to herein as "egress ports." It is noted, however, that each of the ports 104, 106 acts as both an ingress port for packets entering the network device 102 via the port 104, 106 and an egress port for packets egressing the network device 102 via the port 104, 106, in some embodiments. Although the network device 102 is illustrated as including four ingress ports 104 and four egress ports 106, the network device 102 includes suitable other numbers of ingress ports 104 and/or egress ports 106, in various embodiments.

The network device 102 is illustrated in FIG. 1 in a simplified form as including a packet processor 108 comprising a forwarding engine 110, an internal memory 112, and a flow control engine 114. In some embodiments, the packet processor 108 is configured as a pipeline of processing units, such as a pipeline of application-specific integrated circuit (ASIC) engines configured to perform respective processing operations on packets. In one such embodiment, the forwarding engine 110 and the flow control engine 114 correspond to respective ones of the processing units in the pipeline. In other embodiments, the packet processor 108 additionally or alternatively uses a parallel processing architecture in which multiple processors execute machine readable instructions (stored in one or more memory devices coupled to the multiple processors) to process multiple packets in parallel. The internal memory 112 is internal to the packet processor 108 (e.g., implemented on a same die as the packet processor 108), in an embodiment. In another embodiment, at least a portion of the internal memory 112 is external to the packet processor 108 (e.g., implemented on a die separate from the packet processor 108), but is nonetheless internal to the network device 102 (e.g., packaged together with other components of the network device 102).

The packet processor 108 is coupled to the ingress ports 104 and egress ports 106 and is configured to process packets received via ingress ports 104 at least to determine one or more egress ports 106 via which the packets are to be forwarded to one or more downstream network devices coupled to the one or more egress ports 106, in an embodiment. For example, the forwarding engine 110 of the packet processor 108 is configured to determine, based on information from a header of a packet, one or more of the egress ports 106 to which the packet is to be forwarded. The forwarding engine 110 includes or is coupled to a forwarding database (not shown) that stores forwarding information (e.g., port information) associated with addresses (e.g., media access control (MAC) addresses, Internet Protocol (IP) addresses, etc.) and/or other suitable information, in an embodiment. In an embodiment, the forwarding engine 110 is configured to utilize header information to look up information in the forwarding database that indicates one or more ports 106 to which the packet is to be forwarded. The packet processor 108 also performs classification of the packet, for example to determine a priority with which the packet is associated, a packet flow to which the packet belongs, etc., in an embodiment.

The internal memory 112 is configured to store received packets, or at least payload portions of the received packets, while the packet headers of the packets, or other data units representing the packets and including relevant header information and/or metadata corresponding to the packets, are being processed by the packet processor 108. In an embodiment, the internal memory 112 includes a shared buffer space that is shared by multiple ingress ports 104 and configured to store packets received via the multiple ingress ports 104. For example, the internal memory 112 includes a shared buffer space that is shared by ingress ports 104a-104d and configured to store packets received via the ingress ports 104a-104d, in an embodiment.

In some scenarios and embodiments, for example when packets are received by the network device 102 faster than the packets can be processed and/or transmitted by the network device 102, the internal memory 112 of the network device 102 becomes congested. In an embodiment, the flow control engine 114, or other suitable memory utilization monitor, is configured to monitor the shared buffer space in the internal memory 112 and, based on monitoring the shared buffer space, to detect a congestion state of the internal memory 112. In an embodiment, a congested state of the internal memory 112 signifies that the shared buffer space in the internal memory 112 is nearing, but has not yet reached, its full capacity. Upon detecting the congested state of the internal memory 112, the flow control engine 114 performs one or more operations to prevent overflow of the internal memory 112 and to prevent consequent loss of packets that cannot be stored in the internal memory 112, in an embodiment. For example, upon detection of the congestion state in the packet memory 112, the flow control engine 114 generates and triggers transmission of flow control messages via ingress ports 104 to cause temporary reduction of the flow of packets to the network device 102 by the upstream network devices 103 coupled to the ingress ports 104. For ease of explanation, reduction of the flow of packets is described herein as a temporary suspension of transmission of packets. It is noted, however, that reduction of the flow of packets is implemented in other suitable manners, in other embodiments. For example, reduction of the flow of packets comprises temporary reduction of the rate of transmission of packets, in some embodiments.

When upstream network devices 103 suspend transmission of packets to the network device 102, the packets are temporarily stored in respective memories 120 included in or coupled to the upstream network devices 103, in an embodiment. Accordingly, suspension of transmission of packets by the upstream network devices 103 to the network device 102 offloads congestion in the internal memory 112 of the network device 102 to the memories 120 of the upstream network devices 103, in an embodiment.

In various embodiments, memory space available for storing packets in the memories 120 included in or coupled to the upstream network devices 103 is relatively larger than the buffer space of the internal memory 112 of the network device 102. For example, in an embodiment, respective memories 120 included in or coupled to the upstream network devices 103 are independently larger than the internal memory 112 of the network device 102. As a more specific example, in an embodiment in which the network device 102 is network switch device and the upstream network devices 103 are end-point device such as datacenter server devices, the memory 120 included in or coupled to a respective datacenter server device 103 is relatively larger than the internal memory 112 of the network switch device 102. In such embodiments, suspension of transmission of packets by the upstream network devices 103 to the network device 102 offloads congestion in the internal memory 112 of the network device 102 to the relatively larger memory spaces available in the memories 120 included in or coupled to the upstream network devices 103. In other embodiments, the respective memories 120 included in or coupled to the upstream network devices 103 are equal in size to, or are smaller than, the internal memory 112 of the network device 102. However, an aggregate memory space of multiple ones of the respective memories 120 is greater than the buffer space of the internal memory 112, in at least some embodiments. In such embodiments, suspension of transmission of packets by multiple upstream network devices 103 to the network device 102 offloads congestion in the internal memory 112 of the network device 102 to the relatively greater aggregate memory space available in the memories 120 included in or coupled to the multiple upstream network devices 103.

In various embodiments, the flow control engine 114 implements an alternating scheme to alternate flow control between different subsets of the upstream network devices 103 to distribute flow control over time among the different subsets of upstream network devices 103. For example, in an embodiment, upon detecting a first congestion state in the internal memory 112 at a first time, the flow control engine 114 triggers transmission of a first flow control message via a first subset of one or more ports 104 towards a first subset of one or more upstream network devices 103 without triggering transmission of the first flow control message via any ports 104 not included in the first subset of ports 104. Transmission of the first flow control message via the first subset of ports 104 causes upstream network devices 103 in the first subset of upstream network devices 103 to temporarily suspend transmission of packets to the network device 102, without causing any upstream network device 103 not included the first subset of upstream network devices 103 to temporarily suspend transmission of packets to the network switch device 102, in an embodiment.

In an embodiment, the first flow control message is a pause flow control message configured to cause an upstream network device to temporarily pause transmission of all packets via a corresponding network link to the network device 102. In this embodiment, in response to the first flow control message, the upstream network device (e.g., upstream network device 103) temporarily suspends transmission of all packets to the network device 102 via the corresponding network link. In another embodiment, the first flow control message is a priority flow control (PFC) message configured to cause an upstream network device to temporarily pause transmission of packets of particular one or more priorities via a corresponding network link to the network device 102. In this embodiment, in response to the first flow control message, the upstream network device (e.g., upstream network device 103) temporarily suspends transmission of packets of the particular one or more priorities to the network device 102 via the corresponding network link, while continuing transmission of packets of other priorities to the network device 102 via the corresponding network link. In another embodiment, the first flow control message is another suitable flow control message. In general, "flow control message" as used herein is any suitable type of flow control message configured to cause an upstream network device to temporarily suspend transmission of at least some packets, such as all packets, only packets of particular one or more priorities, etc., via a corresponding network link to the network device 102. Similarly, "temporarily suspend transmission of packets" as used herein signifies temporary suspension of transmission at least some packets, such as all packets, only packets of particular one or more priorities, etc.

With continued reference to FIG. 1, the flow control engine 114, or other suitable memory congestion monitor, continues to monitor congestion in the internal memory 112, in an embodiment. Upon detecting a second congested state in the internal memory 112 at a second time subsequent to the first time, the flow control engine 114 triggers transmission of a second flow control message via a second subset of one or more ingress ports 104 towards a second subset of one or more upstream network devices 103 without triggering transmission of the second flow control message via any ingress port 104 that is not included in the second subset of ingress ports 104. In an embodiment, the second subset of ingress ports 104 is different than the first subset of ingress ports 104. For example, the second subset of ingress ports 104 includes one or more ingress ports 104 not included in the first subset of ingress ports 104, in an embodiment. In an embodiment the first subset of ingress ports 104 and the second subset of ports 104 are non-overlapping subsets of ingress ports 104. Transmission of the second flow control message via the second subset of ingress ports 104 causes upstream network devices 103 in the second subset of upstream network devices 103 to temporarily suspend transmission of packets to the network device 102, in an embodiment.

At a third time, subsequent to the first time, the first subset of upstream network devices 103 resumes transmission of packets directed to the network device 102. For example, the first subset of upstream network devices 103 resumes transmission of packets directed to the network device 102 upon expiration of a pause time specified in the first flow control message, in an embodiment. In another embodiment, the first subset of upstream network devices 103 resumes transmission of packets directed to the network device 102 upon receiving an explicit instruction to resume transmission of packets directed to the network device 102.

Similarly, at a fourth time subsequent to the second time, the second subset of upstream network devices 103 resumes transmission of packets directed to the network device 102. For example, the second subset of upstream network devices 103 resumes transmission of packets directed to the network device 102 upon expiration of a pause time specified in the second flow control message, in an embodiment. In another embodiment, the second subset of upstream network device 103 resumes transmission of packets directed to the network device 102 upon receiving an explicit instruction to resume transmission of packets directed to the network device 102.

Subsequently, in response to detecting a congestion state of the internal memory 112, the flow control engine 114 triggers transmission of a third flow control message via a third subset of ports 104 towards a third subset of upstream network devices 103, and so on, until the last subset of ports 104 is reached, and the alternating scheme repeats, in an embodiment. In another embodiment, the flow control engine 114 randomly or statistically selects subsets of ports 104 via which to transmit flow control messages at different times of congestion in the internal memory 112. In other embodiments, other suitable alternating schemes are utilized.

Because the flow control engine 114 triggers transmission of flow control messages via different subsets of ports 104 at different times of congestion in the internal memory 112, flow control is distributed over time among the subsets of upstream network device 103, in an embodiment. For example, during a first time period of congestion in the internal memory 112, a first subset of upstream network devices 103 suspends transmission of packets to the network device 102 while a second subset of upstream network devices 103 continues transmission of packets to the network device 102, in an embodiment. During a second time period of congestion in the internal memory 112, the second subset of upstream network devices 103 suspends transmission of packets to the network device 102, in an embodiment. The first time period and the second time period are staggered with respect to each other, in at least some embodiments. Staggering the first time period and the second time period distributes flow control over time among the subsets of upstream network devices 103 thereby distributing available link bandwidth over time among the subsets of upstream network devices 103, in an embodiment.

As an example, in the embodiment illustrated in FIG. 1, a first port 104a of the network device 102 is coupled via a first network link 105a to a first upstream network device 103a and a second port 104d of the network device 102 is coupled via a second network link 105b to a second upstream network device 103b. At a first time, upon detecting a congested state of the internal memory 112, the flow controller 114, or other suitable memory congestion monitor, generates and triggers transmission of a flow control message 122 via the port 104a towards the upstream network device 103a, without triggering transmission of the flow control message 122 via the port 104d to the upstream network device 103b, in an embodiment. In response to the flow control message 122, the upstream network device 103a temporarily suspends transmission of packets to the network device 102, in an embodiment. Consequently, the congestion in the internal memory 112 of the network device 102 begins to decrease, in an embodiment. The flow control engine 114, or other suitable memory congestion monitor, continues to monitor congestion in the internal memory 112, and if the internal memory 112 is in a congested state at a second time subsequent to the first time, the flow control engine 114 generates and triggers transmission of a flow control message 124 via the port 104d to the upstream network device 103b, without triggering transmission of the flow control message 124 via the port 104a to the upstream network device 103a. In response to the flow control message 124 from the network device 102, the upstream network device 103b temporarily suspends transmission of packets to the network device 102, in an embodiment.

The flow control engine 114, or other suitable memory congestion monitor, continues to monitor congestion in the internal memory 112 and continues alternating between transmission of flow control messages via the port 104a and the port 104d at different times, thereby distributing flow control among the upstream network device 103a and the upstream network device 103b over time, in an embodiment. Distributing flow control among the upstream network device 103a and the upstream network device 103b over time generally improves utilization of the network links 105a and 105b, in at least some embodiments. For example, transmission of the flow control message 122 via the port 104a results in sufficient relief of congestion in the internal memory 112 and delays or eliminates transmission of the flow control message 124 via the port 104d, in some scenarios and embodiments.

Referring to FIG. 2A, a timing diagram 200 illustrates bandwidth of packets transmitted to the network device 102 by respective ones of the upstream network devices 103a and 103b of FIG. 1 over time, according to an embodiment. At a time t0, both the upstream network device 103a and the upstream network device 103b are transmitting packets via respective network links 105a and 105b to the network device 102. The network device 102 receives packets transmitted by the upstream network device 103a and the upstream network device 103b and temporarily stores at least some of the received packets in a shared buffer in the internal memory 112. Upon detecting congestion in the shared buffer of the internal memory 112, at a time t1, the network device 102 transmits a flow control message to the upstream network device 103a without transmitting the flow control message to the upstream network device 103b. At a time t2, in response to the flow control message transmitted to the upstream network device 103a at the time t1, the upstream network device 103a suspends transmission of packets via the network link 105a to the network device 102 and instead buffers packets to be transmitted to the network device 102 in the memory 120a included in or coupled to the upstream network device 103a, in an embodiment. However, because no flow control message is transmitted to the upstream network device 103b at the time t1, the upstream network device 103b continues to transmit packets at the time t2 via the network link 105b to the network device 102. The network device 102, thus, stops receiving packets via the network link 105a from the upstream network device 103a while continuing to receive packets via the network link 105b from the upstream network device 103b resulting in a reduction in the total bandwidth of packets received by the network device 102, in an embodiment. The network device 102 continues temporarily storing at least some of the packets, received from the upstream network device 103b, in the internal memory 112, in an embodiment.

Subsequently, if congestion persists in the internal memory 112, as in the example seen in FIG. 2A, at a time t3, the network device 102 transmits a flow control message to the upstream network device 103b without transmitting the flow control message to the upstream network device 103a. In response to the flow control message transmitted to the upstream network device 103b, at a time t4, the upstream network device 103b suspends transmission of packets via the network link 105b to the network device 102. The upstream network device 103b instead buffers packets to be transmitted to the network device 102 in the memory 120b included in or coupled to the upstream network device 103b, in an embodiment. Between the time t4 and a time t5, transmission of packets to the network device 102 is suspended by both the upstream network device 103a via the network link 105a and the upstream network device 103b via the network link 105b, in the illustrated embodiment. The partial or complete reduction in transmission of packets facilitates packet processor 108 of the network device 102 being able to process packets stored in internal packet memory 112 and mitigate a congestion state of the internal packet memory 112, in an embodiment.

With continued reference to FIG. 2A, at the time t5, the upstream network device 103a resumes transmission of packets via the network link 105a to the network device 102, for example in response to a flow control message instructing the upstream network device 103a to resume transmission to the network device 102, or upon expiration of a pause time indicated in the flow control message transmitted at the time t1 to the upstream network device 103a. The upstream network device 103b, however, continues suspension of transmission of packets via the network link 105b to the network device 102. The network device 102 begins receiving packets via the network link 105a from the upstream network device 103b and temporarily storing at least some of the received packets in the internal memory 112, in an embodiment. At a time t6, the upstream network device 103b resumes transmission of packets to the network device 102, for example in response to a flow control message instructing the upstream network device 103b to resume transmission to the network device 102, or upon expiration of a pause time indicated in the flow control message transmitted at the time t3 to the upstream network device 103b. In the example of FIG. 2A, at the time t6, both the upstream network device 103a and the upstream network device 103b are again transmitting packets via respective network links 105a and 105b to the network device 102. The network device 102 receives packets via the network link 105a from the upstream network device 103a and via the network link 105b from the upstream network device 103b and temporarily stores at least some of the received packets in the internal memory 112, in an embodiment.

The network device 102 continues to monitor congestion in the shared buffer space in the internal memory 112, and selectively alternates between causing one of the upstream network device 103a and the upstream network device 103b to suspend transmission of packets to the network device 102 without causing the other one of the upstream network device 103a and the upstream network device 103b to suspend transmission of packets to the network device 102, in an embodiment. A decision as to which upstream network device 103 is suspended is made based on various considerations, including for example relative bandwidths of respective network links 105 between the network device 102 and the upstream network devices 103, a rate at which the internal memory 112 of the network device 102 is becoming congested, total priorities of different flows from the respective upstream network devices 103 to the network device 102, randomization of suspension and the like. Alternating flow control between the upstream network device 103a and the upstream network device 103b generally reduces the amount of time (e.g., the time between t4 and t5) during which transmission of packets to the network device 102 needs to be suspended by both the upstream network device 103a via the network link 105a and the upstream network device 103b via the network link 105b, thereby increasing link utilization of the network link 105a and the network link 105b as compared to systems in which congestion in a shared buffer of a network device 102 results in simultaneous suspension of transition of packets to multiple ports that share the buffer, in at least some embodiments.

Referring briefly to FIG. 2B, a timing diagram 250 illustrates a combined bandwidth of packets transmitted to the network device 102 by both the upstream network device 103a and the upstream network upstream network device 103b, according to an embodiment. The timing diagram 250 illustrates the combined bandwidth over time in an embodiment in which the flow of packets from the upstream network device 103a and the upstream network upstream network device 103b is controlled in accordance with the timing diagram 200 of FIG. 2A. Referring to the timing diagram 250, at the time t0, the combined bandwidth of packets transmitted to the network device 102 equals a sum of the full bandwidth of packets transmitted to the network device 102 by the upstream network device 103a and the full bandwidth of packets transmitted to the network device 102 by the upstream network device 103b. At the time t2, the combined bandwidth of packets transmitted to the network device 102 is reduced, due to suspension of transmission of packets to the network device 102 by the upstream network device 103, but is not completely suspended, in the illustrated embodiment. The combined flow of packets to the network device 102 is completely suspended at the time t4. Subsequently, at the time t5, the combined flow of packets to the network device 102 is partially resumed, due to resumption of transmission of packets to the network device 102 by the upstream network device 103a. At the time t6, the combined flow of packets to the network device 102 is increased to again match the bandwidth at the time t0, in the illustrated embodiment. In the timing diagram 250, the flow of packets to the network device 102 is completely suspended for only a relatively short period of time between the time t4 and the time t5. The period of time between the time t4 and the time t5 during which flow of packets to the network device 102 is completely suspended is relatively short as compared to systems in which congestion in a shared buffer space of a network device 102 results in suspension of transition of packets from multiple (e.g. all) upstream network device to multiple (e.g., all) ingress ports that share a shared buffer space, in an embodiment. In some embodiments, alternating flow control between the upstream network device 103a and the upstream network device 103b completely eliminates a period of time during which transmission of packets to the network device 102 by both the upstream network device 103a and the upstream network device 103b is simultaneously suspended.

Referring back to FIG. 1, in some embodiments, the flow control engine 114, or other suitable memory congestion monitor, is configured to monitor congestion in the internal memory 112 by monitoring a current fill level of the shared buffer space in the internal memory 112 and comparing the current fill level of the shared buffer space 112 to a threshold. The flow control engine is configured to distribute flow control among the upstream network devices 103 by implementing different thresholds for triggering flow control messages via respective ports 104 coupled to respective upstream network devices 103. In an embodiment, the flow control engine 114 is configured to randomly generate different thresholds for triggering transmission of flow control messages via different ports 104. For example, the flow control engine 114 includes a random threshold generator (not shown) configured to output sets of randomized threshold values corresponding to respective ports 104, or respective subsets of ports 104, at different measurement times. In an embodiment, the random threshold generator is configured to generate randomized threshold values of i*average response time, where i is a randomly generated number between 0 and 2, and the average response time is an average amount of time between a time that the flow control engine 114 generates a flow control message and a time that the network device 102 actually stops receiving packets in response to the flow control message. In other embodiments, other suitable randomized threshold values are used.

The flow control engine 114 is configured to compare the fill level of the shared buffer space in the internal memory 112 to each of the respective threshold values corresponding to the respective ports 104, in an embodiment. If, at a given measurement time, the current fill level of the shared buffer space in the internal memory 112 exceeds the threshold value corresponding to a particular port 104 or a particular subset of ports 104, then the flow control engine 114 generates and triggers transmission of a flow control message via the particular port 104 or the particular subset of ports 104, without triggering transmission of the flow control message via other ports 104. Thus, for example, based on the comparison of a current fill level of the shared buffer space in the internal memory 112 to each of the respective threshold values corresponding to the respective ports 104 at a first time, the flow control engine 114 generates and triggers transmission of a flow control message towards one or more first upstream network devices 103 without triggering transmission of the flow control message towards other one or more of the upstream network devices 103, in an embodiment. Subsequently, based on the comparison of a current fill level of the shared buffer space in the internal memory 112 to each of the respective thresholds corresponding to the respective ports 104 at a second time, the flow control engine 114 generates and triggers transmission of a flow control message towards one or more second upstream network devices 103 without triggering transmission of the flow control message towards other upstream network devices 103, and so on, in an embodiment.

As a more specific example, in an example scenario, a threshold generated for the port 104a at a first time is relatively lower than a relatively higher threshold generated for the port 104d at the first time, in an embodiment. In this example scenario, the current fill level at the first time exceeds the relatively lower threshold corresponding to the port 104a but does not exceed the relatively higher threshold corresponding to the port 104d. Accordingly, in this scenario, the flow control engine 114 at the first time generates and triggers transmission of the flow control message 122 via the port 104a without triggering transmission of the flow control message 122 via the port 104d. On the other hand, at a second time, a threshold generated for the port 104a is relatively higher than a relatively lower threshold generated for the port 104d, in an embodiment, and the current fill level at the second time does not exceed the relatively higher threshold corresponding to the port 104a but exceeds the relatively lower threshold corresponding to the port 104d, even if, for example, the current fill level at the second time is the same as or lower than the current fill level at the first time. Accordingly, in this scenario, the flow control engine 114 at the second time generates and triggers transmission of the flow control message 124 via the port 104d without triggering transmission of the flow control message 124 via the port 104a, in an embodiment.

In another embodiment, the flow control engine 114 is configured to utilize a timing schedule for distributing flow control among the upstream network devices 103. For example, the flow control engine 114 is configured to utilize a repeating timing schedule that specifies a plurality of timeslots for transmission of flow control messages via different ports 104, or via different subsets of ports 104, if a current fill level of the internal memory 112 exceeds a predetermined threshold in different ones of the timeslots. As an example, the repeating timing schedule specifies a first timeslot for transmission of a flow control message via a first subset of ports 104, a second timeslot for transmission of a flow control message via a second subset of ports 104, a third timeslot for transmission of a flow control message a third subset of ports 104, and so on, in an embodiment. When the last scheduled subset of ports 104 is reached, the timing schedule is repeated beginning with the first timeslot specifying transmission of a flow control message via the first subset of ports 104, in an embodiment. The flow control engine 114 is configured to compare the current fill level, corresponding to a current time slot, of the shared buffer space in the internal memory 112 to a predetermined threshold. If i) the current fill level of the shared buffer space in the internal memory 112 exceeds the predetermined threshold and ii) the current timeslot is the first timeslot, then the flow control engine 114 triggers transmission of a flow control message via the first subset of one or more ports 104 specified for flow control in the first timeslot. The flow control engine 114 triggers transmission of the flow control message via the first subset of one or more ports 104 without triggering transmission of the flow control message via ports 104 that are not included in the first subset, in an embodiment. The flow control engine 114, or other suitable memory congestion monitor, continues to monitor the fill level of the internal memory 112 and to compare current fill levels of the internal memory 112 to the predetermined threshold, in an embodiment. Thus, if) the current fill level of the internal memory 112 exceeds the predetermined threshold and ii) the current timeslot is the second timeslot, then the flow control engine 114 triggers transmission of a flow control message via the second subset of one or more ports 104 specified for flow control in the second timeslot, without triggering transmission of the flow control message via other ports 104 that are not included in the second subset, and so on, in an embodiment.

In another embodiment, the flow control engine 114 is configured distribute flow control among the upstream network devices 103 by statistically determining whether to transmit flow control messages via respective ports 104. For example, the flow control engine 114 is configured to determine whether or not to transmit a flow control message via a port 104 with a probability that increases with increasing fill level of the shared buffer space of the internal memory 112, in an embodiment. For example, the flow control engine 114 determines whether or not to transmit flow control messages via respective ports 104 or subsets of ports 104 based on a probability obtained from a statistical curve, such as an early random detection (RED) curve or a weighted early random detection (WRED) curve, in some embodiments. In this embodiment, if the current fill level of the shared buffer space in the internal memory 112 is below a minimum threshold value, then the flow control engine 114 does not transmit a flow control message via any of the ports 104. If the current fill level of the shared buffer space in the internal memory 112 is above a maximum threshold value, then the flow control engine 114 triggers transmission of a flow control message via all of the ports 104 that share the buffer space. However, if the current fill level of the shared buffer space in the internal memory 112 is between the minimum threshold value and the maximum threshold value, the flow control engine 114 determines whether or not to transmit a flow control message via each respective subset of port 104 based on a probability, where the probability increases with increasing fill level of the shared buffer space in the internal memory 112. Probabilistic determination of whether or not to transmit a flow control message via respective subsets of ports 104 results in different decisions made for different subsets of ports 104, in an embodiment. Accordingly, in response to detecting congested states in the shared buffer space in the internal memory 112, the flow control engine 114 triggers transmission of flow control messages via different subsets of ports 104 at different times, thereby distributing flow control among the corresponding different subsets of upstream network devices 103, in an embodiment. In some embodiments, different subsets of ports 104 are assigned different weights that make it relatively more, or relatively less, likely that a flow control message is transmitted via particular subsets of ports 104. In some embodiments, the flow control engine 114 generates randomized weights corresponding to respective subsets of ports 104, and applies different randomized weights to a probability obtained based on the current fill level of the shared buffer space to determine whether or not to transmit a flow control message via different subsets of ports 104.

In some embodiments, distribution of flow control is implemented by the upstream network devices 103, in addition to or instead of distribution of flow control implemented by the network device 102. For example, different subsets of upstream network devices 103 are configured to respond to flow control messages at different times (e.g., during different timeslots), in an embodiment. In this embodiment, when an upstream network device 103 receives a flow control message via a network link, the upstream network device 103 does not necessarily respond by suspending transmission of packets as instructed by the flow control message via the network link. Instead, the upstream network device 103 checks if the current timeslot is designated for flow control by the upstream network device 103. If the current timeslot is not designated for flow control by the upstream network device 103, then the upstream network device 103 ignores the flow control message, in an embodiment. In another embodiment, if the current timeslot is not designated for flow control by the upstream network device 103, then the upstream network device 103 continues to transmit packets via the network link until its designated flow control timeslot and then suspends transmission of packets via the network link, in an embodiment.

Figure 3:
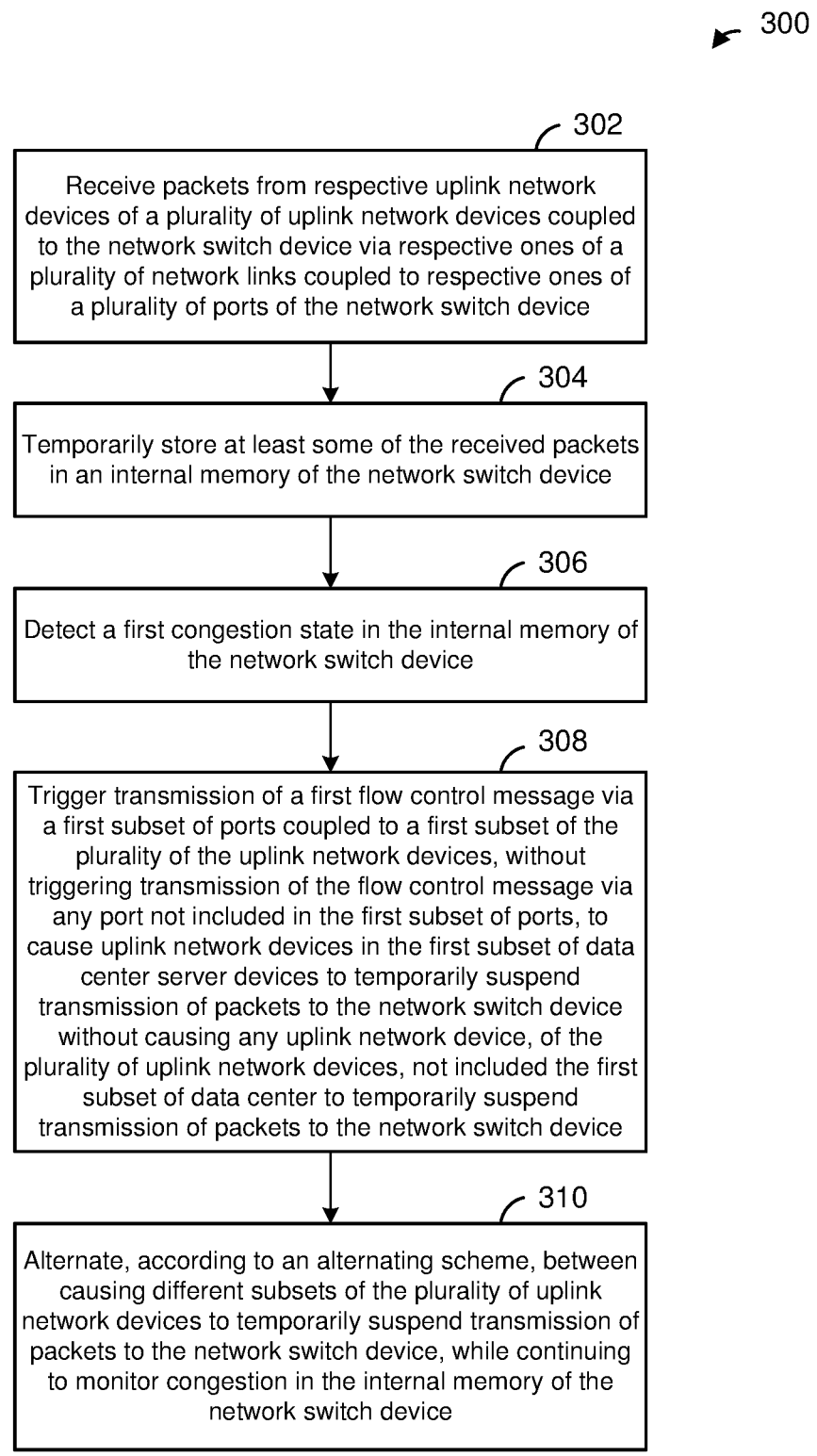
FIG. 3 is a flow diagram illustrating an example method for controlling congestion in a network switch device, according to an embodiment.

FIG. 3 is a flow diagram illustrating an example method 300 for controlling congestion at a network device, according to an embodiment. In an embodiment, the network device 102 of FIG. 1 implements the method 300 to control congestion in the internal memory 112 of the network device 102. For example, the flow control engine 114 of the network device 102 is configured to implement at least a portion of the method 300 to control congestion in the internal memory 112, in an embodiment. For ease of explanation, the method 300 is described below with reference to the network device 102 of FIG. 1. However, the method 300 is implemented by suitable network devices different from the network device 102 of FIG. 1, in other embodiments.

At block 302, packets are received from respective upstream network devices of a plurality of upstream network devices coupled to the network switch device via respective ones of a plurality of network links coupled to respective ones of a plurality of ports of the network switch device. For example, the plurality of packets are received via respective ports 104 coupled via respective network links 105 to respective upstream network devices 103.

At block 304, at least some of the packets received at block 302 are temporarily stored in an internal memory of the network switch device. For example, the at least some of the packets are temporarily stored in the internal memory 112 of the network switch device 102. As a more specific example, the at least some of the packets are temporarily stored in a shared buffer space in the internal memory 112, the buffer space being shared for storing packets received via the plurality of ports 104.

At block 306, a first congestion state in the internal memory is detected. For example, the flow control engine 114 detects the first congestion state in the internal memory 112, in an embodiment. The first congestion state signifies that the shared buffer space in the internal memory 112 is nearing depletion, in an embodiment. In an embodiment, the first congestion state is determined based on a current fill level of the shared buffer space. For example, the first congestion state is detected if the current fill level of the shared buffer space exceeds a first randomized threshold, in an embodiment. In another embodiment, the first congestion state is detected if a fill level of the shared buffer space exceeds a predetermined threshold during a first timeslot. In yet another embodiment, the first congestion state is probabilistically determined, with probability of detecting the first congestion state increasing with increasing fill level of the shared buffer space. In other embodiments, the first congestion state is detected in other suitable manners.

At block 308, in response to detecting the first congestion state in the internal memory, the flow control engine 114 triggers transmission of a first flow control message via a first subset of ports 104 coupled to a first subset of upstream network devices 103, without triggering transmission of the first flow control message via any port 104 not included in the first subset of ports 104, to cause upstream network devices in the first subset of the upstream network devices 103 to temporarily suspend transmission of packets to the network switch device without causing any upstream network device 103 not included the first subset of upstream network devices 103 to temporarily suspend transmission of packets to the network switch device 102.

At block 310, an alternating scheme is used to alternate between causing different subsets of the plurality of upstream network devices to temporarily suspend transmission of packets to the network switch device, while the flow control engine continues to monitor congestion in the internal memory of the network switch device. Thus, for example, at a time subsequent to detecting the first congestion state, the flow control engine 114 detects a second congestion state in the internal memory 112. In an embodiment, the second congestion state is determined based on a current fill level of the shared buffer space in the internal memory 112 at the subsequent time. For example, the second congestion state is detected if the current fill level of the shared buffer space in the internal memory 112 at the subsequent time exceeds a second randomized threshold, in an embodiment. In another embodiment, the second congestion state is detected if a fill level of the shared buffer space in the internal memory 112 at the subsequent time exceeds a predetermined threshold during a second timeslot. In yet another embodiment, the second congestion state is probabilistically determined, with probability of detecting the second congestion state increasing with increasing fill level of the shared buffer space. In other embodiments, the second congestion state is detected in other suitable manners.

In response to detecting the second congestion state of the shared buffer space in the internal memory 112 at the subsequent time, the flow control engine 114 triggers transmission of a second flow control message via a second subset of ports, different than the first subset of ports, coupled to a second subset of upstream network devices, different than the first subset of upstream network devices. In an embodiment, the flow control engine 114 triggers transmission of the second flow control message via the second subset of ports 104 without triggering transmission of the second flow control message via any port 104 not included in the second subset of ports 104, to cause upstream network devices 103 in the second subset of upstream network devices 103 to temporarily suspend transmission of packets to the network switch device 102 without causing any upstream network devices 103 not included the second subset of upstream network devices 103 to temporarily suspend transmission of packets to the network switch device 102, in an embodiment.

In an embodiment, a method for controlling congestion at a network switch device includes receiving packets at the network switch device from respective upstream network devices of a plurality of upstream network devices coupled to the network switch device via respective ones of a plurality of ports of the network switch device; temporarily storing at least some of the received packets in an internal memory of the network switch device; detecting, with a flow control engine of the network switch device, a first congestion state in the internal memory of the network switch device; in response to detecting the first congestion state in the internal memory, triggering, with the flow control engine, transmission of a first flow control message via a first subset of ports, of the plurality of ports, coupled to a first subset of upstream network devices, of the plurality of upstream network devices, without triggering transmission of the flow control message via any port not included in the first subset of ports, to cause upstream network devices in the first subset of upstream network devices to temporarily suspend transmission of packets to the network switch device without causing any upstream network device not included in the first subset of upstream network devices, of the plurality of uplink network devices, to temporarily suspend transmission of packets to the network switch device; and alternating, with the flow control engine, between causing different subsets of the plurality of upstream network devices to temporarily suspend transmission of packets to the network switch device, while the flow control engine continues to monitor congestion in the internal memory of the network switch device.

In other embodiments, the method includes any suitable combination of one or more of the following features.

Alternating between causing different subsets of the plurality of upstream network devices to temporarily suspend transmission of packets to the network switch device includes: subsequently to detecting the first congestion state in the internal memory of the network switch device, detecting, with the flow control engine, a second congestion state in the internal memory of the network switch device, and in response to detecting the second congestion state in the internal memory, triggering, with the flow control engine, transmission of a second flow control message via a second subset of ports, of the plurality of ports, coupled to a second subset of upstream network devices of the plurality of upstream network devices, without triggering transmission of the second flow control message via any port not included in the second subset of ports, to cause upstream network devices in the second subset of upstream network devices to temporarily suspend transmission of packets to the network switch device without causing any upstream network device not included in the second subset of the upstream network devices to temporarily suspend transmission of packets to the network switch device.

Temporarily storing at least some of the received packets in the internal memory of the network switch device includes temporarily storing, in a shared buffer disposed in the internal memory, packets received via at least the first subset of ports and the second subset of ports.

Detecting the first congestion state and the second congestion state in the internal memory comprises detecting the congestion state based on monitoring a fill level of the shared buffer disposed in the internal memory.

Detecting the first congestion state comprises detecting the first congestion state if the fill level of the shared buffer meets a first congestion criteria.

Detecting the second congestion state comprises detecting the second congestion state if the fill level of the shared buffer meets a second congestion criteria different from the first congestion criteria.

Detecting the first congestion state if the fill level of the shared buffer meets the first congestion criteria comprises detecting the first congestion state if the fill level of the shared buffer exceeds a first threshold value.

Detecting the second congestion state if the fill level of the shared buffer meets the second congestion criteria comprises detecting the second congestion state if the fill level of the shared buffer exceeds a second threshold value different from the first threshold value.

The method further includes, prior to detecting the first congestion state and detecting the second congestion state, generating, using a random number generator, the first threshold value and the second threshold value.

Generating the first threshold value comprises multiplying an average flow control response time by a first random number generated by the random number generator, wherein the average flow control response time is determined based on respective flow control response times of respective upstream network devices of the plurality of upstream network devices coupled to the network switch device.

Generating the second threshold value comprises multiplying the average flow control response time by a second random number generated by the random number generator.

Detecting the first congestion state comprises detecting the first congestion state if a first fill level of the shared buffer exceeds a predetermined threshold during a first timeslot.

Detecting the second congestion state comprises detecting the second congestion state if a second fill level of the shared buffer exceeds the predetermined threshold during a second timeslot different from the first timeslot.

Detecting the first congestion state and the second congestion state comprises probabilistically determining the first congestion state and the second congesting state, wherein probability of determining the first congestion state and the second congestion state increases with increasing fill level of the shared buffer.

Triggering transmission of the first flow control message comprises triggering transmission of a first priority flow control (PFC) message to cause the first upstream network device to temporarily suspend transmission of packets of a particular priority to the network switch device for a first specified period of time.

In another embodiment, a network switch device comprises a plurality of ports for coupling via respective network links to respective upstream network devices of a plurality of upstream network devices, an internal memory configured to temporarily store at least some packets received via respective ports of the plurality of ports, and a flow control engine. The flow control engine is configured to: detect a first congestion state in the internal memory of the network switch device; in response to detecting the first congestion state in the internal memory, trigger transmission of a first flow control message via a first subset of ports, of the plurality of ports, coupled to a first subset of upstream network devices, of the plurality of upstream network devices, without triggering transmission of the flow control message via any port not included in the first subset of ports, to cause upstream network devices in the first subset of upstream network devices to temporarily suspend transmission of packets to the network switch device without causing any upstream network device, of the plurality of upstream network devices, not included in the first subset of upstream network devices to temporarily suspend transmission of packets to the network switch device; and alternate between causing different subsets of the plurality of upstream network devices to temporarily suspend transmission of packets to the network switch device, while the flow control engine continues to monitor congestion in the internal memory of the network switch device.

In other embodiments, the network switch device comprises any suitable combination of one or more of the following features.

The flow control engine is configured to subsequently to detecting the first congestion state in the internal memory of the network switch device, detect a second congestion state in the internal memory of the network switch device, and in response to detecting the second congestion state in the internal memory, trigger transmission of a second flow control message via a second subset of ports, of the plurality of ports, coupled to a second subset of upstream network devices of the plurality of upstream network devices, without triggering transmission of the second flow control message via any port not included in the second subset of ports, to cause upstream network devices in the second subset of upstream network devices to temporarily suspend transmission of packets to the network switch device without causing any upstream network device not included in the second subset of the upstream network devices to temporarily suspend transmission of packets to the network switch device.

The internal memory is configured to temporarily store, in a shared buffer, packets received via at least the first subset of ports and the second subset of ports.

The flow control engine is configured to detect the first congestion state and the second congestion state in the internal memory based on monitoring a fill level of the shared buffer disposed in the internal memory.

The flow control engine is configured to detect the first congestion state if the fill level of the shared buffer meets a first congestion criteria.

The flow control engine is configured to detect the second congestion state if the fill level of the shared buffer meets a second congestion criteria different from the first congestion criteria.

The flow control engine is configured to detect the first congestion state if the fill level of the shared buffer exceeds a first threshold value.

The flow control engine is configured to detect the second congestion state if the fill level of the shared buffer exceeds a second threshold value different from the first threshold value.

The flow control engine is further configured to, prior to detecting the first congestion state and detecting the second congestion state, generate, using a random number generator, the first threshold value and the second threshold value.

The flow control engine is configured to generate the first threshold value at least by multiplying an average flow control response time by a first random number generated by the random number generator, wherein the average flow control response time is determined based on respective flow control response times of respective upstream network devices of the plurality of upstream network devices coupled to the network switch device, and generate the second threshold value at least by multiplying the average flow control response time by a second random number generated by the random number generator.

The flow control engine is configured to detect the first congestion state if a first fill level of the shared buffer exceeds a predetermined threshold during a first timeslot.

The flow control engine is configured to detect the second congestion state if a second fill level of the shared buffer exceeds the predetermined threshold during a second timeslot different from the first timeslot.

The flow control engine is configured to detect the first congestion state and the second congestion state at least by probabilistically determining the first congestion state and the second congesting state, wherein probability of determining the first congestion state and the second congestion state increases with increasing fill level of the shared buffer.

The flow control engine is configured to triggering transmission of the first flow control message at least by triggering transmission of a first priority flow control (PFC) message to cause the first upstream network device to temporarily suspend transmission of packets of a particular priority to the network switch device for a first specified period of time.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention. For example, one or more portions of methods or techniques described above may be performed in a different order (or concurrently) and still achieve desirable results.

What is claimed is:

1. A method for controlling congestion at a network switch device, the method comprising:
    receiving packets at the network switch device from respective upstream network devices of a plurality of upstream network devices, the respective upstream network devices coupled to the network switch device via respective ones of a plurality of ports of the network switch device;
    temporarily storing at least some of the received packets in an internal memory of the network switch device;
    detecting, with a flow control engine of the network switch device, congestion in the internal memory of the network switch device; and
    in response to detecting congestion in the internal memory of the network device, triggering, during respective timeslots of a timing schedule and while the flow control engine continues to monitor congestion in the internal memory of the network switch device, transmission of respective flow control messages via different subsets of ports, among the plurality of ports, to control flow of packets from different subsets of upstream network devices, among the plurality of upstream network devices, to the network switch device so that flow control is distributed over time among upstream network devices of the plurality of upstream network devices.

2. The method of claim 1, wherein
detecting congestion in the internal memory comprises detecting a first congestion state in the internal memory, and
triggering transmission of flow control messages includes,
    in response to detecting the first congestion state in the internal memory, triggering transmission of a first flow control message via a first subset of ports among the plurality of ports without triggering transmission of the first flow control message via any port not included in the first subset of ports,
    subsequently to detecting the first congestion state in the internal memory, detecting a second congestion state in the internal memory of the network switch device, and
    in response to detecting the second congestion state in the internal memory, triggering transmission of a second flow control message via a second subset of ports without triggering transmission of the second flow control message via any port not included in the second subset of ports.

3. The method of claim 2, wherein
temporarily storing at least some of the received packets in the internal memory of the network switch device includes temporarily storing, in a shared buffer disposed in the internal memory, packets received via at least the first subset of ports and the second subset of ports, and
detecting the first congestion state and the second congestion state in the internal memory comprises detecting the congestion state based on monitoring a fill level of the shared buffer disposed in the internal memory.

4. The method of claim 3, wherein
detecting the first congestion state comprises detecting the first congestion state if the fill level of the shared buffer meets a first congestion criteria, and
detecting the second congestion state comprises detecting the second congestion state if the fill level of the shared buffer meets a second congestion criteria different from the first congestion criteria.

5. The method of claim 4, wherein
detecting the first congestion state if the fill level of the shared buffer meets the first congestion criteria comprises detecting the first congestion state if the fill level of the shared buffer exceeds a first threshold value, and
detecting the second congestion state if the fill level of the shared buffer meets the second congestion criteria comprises detecting the second congestion state if the fill level of the shared buffer exceeds a second threshold value different from the first threshold value.

6. The method of claim 5, further comprising, prior to detecting the first congestion state and detecting the second congestion state, generating, using a random number generator, the first threshold value and the second threshold value.

7. The method of claim 6, wherein
generating the first threshold value comprises multiplying an average flow control response time by a first random number generated by the random number generator, wherein the average flow control response time is determined based on respective flow control response times of respective upstream network devices of the plurality of upstream network devices coupled to the network switch device, and
generating the second threshold value comprises multiplying the average flow control response time by a second random number generated by the random number generator.

8. The method of claim 3, wherein
detecting the first congestion state comprises detecting the first congestion state if a first fill level of the shared buffer exceeds a predetermined threshold during a first timeslot, and
detecting the second congestion state comprises detecting the second congestion state if a second fill level of the shared buffer exceeds the predetermined threshold during a second timeslot different from the first timeslot.

9. The method of claim 3, wherein detecting the first congestion state and the second congestion state comprises probabilistically determining the first congestion state and the second congesting state, wherein probability of determining the first congestion state and the second congestion state increases with increasing fill level of the shared buffer.

10. The method of claim 1, wherein triggering transmission of respective flow control messages via different subsets of ports comprises triggering transmission of respective priority flow control (PFC) messages via the different subsets of ports to cause the different subsets of upstream network devices to temporarily suspend transmission of packets of a particular priority to the network switch device for a specified period of time.

11. A network switch device, comprising:
a plurality of ports for coupling via respective network links to respective upstream network devices of a plurality of upstream network devices;
an internal memory configured to temporarily store at least some packets received via respective ports of the plurality of ports; and
a flow control engine configured to
detect congestion in the internal memory, and
in response to detecting congestion in the internal memory, trigger, during respective timeslots of a timing schedule and while the flow control engine continues to monitor congestion in the internal memory of the network switch device, transmission of respective flow control messages via different subsets of ports, among the plurality of ports, to control flow of packets from different subsets of upstream network devices, among the plurality of upstream network devices, to the network switch device so that flow control is distributed over time among upstream network devices of the plurality of upstream network devices.

12. The network switch device of claim 11, wherein the flow control engine is configured to:
detect a first congestion state in the internal memory,
in response to detecting the first congestion state in the internal memory, trigger transmission of a first flow control message via a first subset of ports among the plurality of ports without triggering transmission of the first flow control message via any port not included in the first subset of ports,
subsequently to detecting the first congestion state in the internal memory, detect a second congestion state in the internal memory of the network switch device, and
in response to detecting the second congestion state in the internal memory, trigger transmission of a second flow control message via a second subset of ports without triggering transmission of the second flow control message via any port not included in the second subset of ports.

13. The network switch device of claim 12, wherein
the internal memory is configured to temporarily store, in a shared buffer, packets received via at least the first subset of ports and the second subset of ports, and
the flow control engine is configured to detect the first congestion state and the second congestion state in the internal memory based on monitoring a fill level of the shared buffer disposed in the internal memory.

14. The network switch device of claim 13, wherein the flow control engine is configured to:
detect the first congestion state if the fill level of the shared buffer meets a first congestion criteria, and
detect the second congestion state if the fill level of the shared buffer meets a second congestion criteria different from the first congestion criteria.

15. The network switch device of claim 14, wherein the flow control engine is configured to:
detect the first congestion state if the fill level of the shared buffer exceeds a first threshold value, and
detect the second congestion state if the fill level of the shared buffer exceeds a second threshold value different from the first threshold value.

16. The network switch device of claim 15, wherein the flow control engine is further configured to, prior to detecting the first congestion state and detecting the second congestion state, generate, using a random number generator, the first threshold value and the second threshold value.

17. The network switch device of claim 16, wherein the flow control engine is configured to:
generate the first threshold value at least by multiplying an average flow control response time by a first random number generated by the random number generator, wherein the average flow control response time is determined based on respective flow control response times of respective upstream network devices of the plurality of upstream network devices coupled to the network switch device, and
generate the second threshold value at least by multiplying the average flow control response time by a second random number generated by the random number generator.

18. The network switch device of claim 14, wherein the flow control engine is configured to:
detect the first congestion state if a first fill level of the shared buffer exceeds a predetermined threshold during a first timeslot, and
detect the second congestion state if a second fill level of the shared buffer exceeds the predetermined threshold during a second timeslot different from the first timeslot.

19. The network switch device of claim 13, wherein the flow control engine is configured to detect the first congestion state and the second congestion state at least by probabilistically determining the first congestion state and the second congesting state, wherein probability of determining the first congestion state and the second congestion state increases with increasing fill level of the shared buffer.

20. The network switch device of claim 11, wherein the flow control engine is configured to trigger transmission of respective flow control messages via different subsets of ports at least by triggering transmission of respective priority flow control (PFC) messages via the different subsets of ports to cause the different subsets of upstream network devices to temporarily suspend transmission of packets of a particular priority to the network switch device for a specified period of time.

* * * * *